United States Patent
Wood et al.

(10) Patent No.: US 10,829,206 B2
(45) Date of Patent: Nov. 10, 2020

(54) WING LEADING EDGE FEATURES TO ATTENUATE PROPELLER WAKE-WING ACOUSTIC INTERACTIONS

(71) Applicant: General Electric Company, Schenectady, NY (US)

(72) Inventors: Trevor Howard Wood, Clifton Park, NY (US); Kishore Ramakrishnan, Rexford, NY (US); Davide Giacché, Bavaria (DE)

(73) Assignee: General Electric Company, Schenectady, NY (US)

( * ) Notice: Subject to any disclaimer, the term of this patent is extended or adjusted under 35 U.S.C. 154(b) by 581 days.

(21) Appl. No.: 15/429,829

(22) Filed: Feb. 10, 2017

(65) Prior Publication Data

US 2017/0225773 A1    Aug. 10, 2017

Related U.S. Application Data

(60) Provisional application No. 62/293,523, filed on Feb. 10, 2016.

(51) Int. Cl.
 *B64C 21/10*    (2006.01)
 *B64D 27/12*    (2006.01)
 (Continued)

(52) U.S. Cl.
 CPC ............... *B64C 21/10* (2013.01); *B64C 3/10* (2013.01); *B64C 3/16* (2013.01); *B64D 27/12* (2013.01); *B64C 2230/14* (2013.01); *Y02T 50/10* (2013.01)

(58) Field of Classification Search
 CPC ....... B64C 3/10; B64C 21/10; B64C 2220/00; B64C 2230/14; B64C 23/00; B64C 23/06
 See application file for complete search history.

(56) References Cited

U.S. PATENT DOCUMENTS

| 2,581,625 | A | * | 1/1952 | Brady | ..................... B64C 11/00 244/129.1 |
| 4,534,526 | A | * | 8/1985 | Metzger | ..................... B64C 3/00 181/208 |

(Continued)

FOREIGN PATENT DOCUMENTS

| JP | S62-194993 A | 8/1987 |
| JP | H08-188192 A | 7/1996 |

(Continued)

OTHER PUBLICATIONS

International Search Report and Written Opinion issued in connection with corresponding PCT Application No. PCT/US2017/019703 dated Nov. 2, 2017.

(Continued)

*Primary Examiner* — Philip J Bonzell
(74) *Attorney, Agent, or Firm* — Dority & Manning, P.A.

(57) ABSTRACT

An apparatus configured to reduce acoustic interactions between a propeller and a surface of an aircraft positioned downstream of the propeller includes a surface modification element of the surface of the aircraft. The surface modification element defines a modified contour of the surface. The modified contour is configured to decorrelate a phase distribution of a plurality of sound sources within a source field positioned on at least a portion of the surface.

24 Claims, 11 Drawing Sheets

(51) Int. Cl.
  *B64C 3/10*   (2006.01)
  *B64C 3/16*   (2006.01)

(56) References Cited

U.S. PATENT DOCUMENTS

| | | | | |
|---|---|---|---|---|
| 5,823,467 | A * | 10/1998 | Mathur | B64C 1/12 244/1 N |
| 6,431,498 | B1 | 8/2002 | Watts et al. | |
| 8,083,487 | B2 | 12/2011 | Wood et al. | |
| 8,136,757 | B2 * | 3/2012 | Kelm | B64C 3/50 244/75.1 |
| 8,535,008 | B2 | 9/2013 | Dewar et al. | |
| 8,651,426 | B2 | 2/2014 | Morvant et al. | |
| 8,740,139 | B1 * | 6/2014 | Dunavan | B64C 3/10 244/54 |
| 8,904,795 | B2 | 12/2014 | Oishi et al. | |
| 9,227,721 | B1 | 1/2016 | Nguyen | |
| 9,249,666 | B2 | 2/2016 | Wood et al. | |
| 9,630,702 | B2 * | 4/2017 | Alonso-Miralles | B64D 27/26 |
| 9,725,155 | B2 * | 8/2017 | Miller | B64C 1/40 |
| 10,293,916 | B2 * | 5/2019 | Knepper | B64C 3/10 |
| 2006/0060721 | A1 * | 3/2006 | Watts | B64C 23/00 244/200 |
| 2009/0127405 | A1 * | 5/2009 | Hahn | B64C 3/10 244/35 R |
| 2009/0152400 | A1 * | 6/2009 | Verde Preckler | B64D 27/14 244/133 |
| 2009/0152405 | A1 * | 6/2009 | Kelm | B64C 3/50 244/215 |
| 2012/0211599 | A1 * | 8/2012 | Morvant | B64C 7/02 244/1 N |
| 2013/0164488 | A1 | 6/2013 | Wood et al. | |
| 2014/0290270 | A1 * | 10/2014 | Bodard | B64D 29/02 60/797 |
| 2017/0008610 | A1 * | 1/2017 | Knepper | B64C 3/10 |

FOREIGN PATENT DOCUMENTS

| | | |
|---|---|---|
| JP | H10-71993 A | 3/1998 |
| KR | 10-2016-0000148 A | 1/2016 |
| WO | 2015/167263 A1 | 11/2015 |

OTHER PUBLICATIONS

Polacsek et al., "Turbulence-airfoil interaction noise reduction using wavy leading edge: An experimental and numerical study", Internoise 2011, pp. 1-11, Sep. 4-7, 2011.

* cited by examiner

WING LEADING EDGE FEATURES TO ATTENUATE PROPELLER WAKE-WING ACOUSTIC INTERACTIONS

CROSS-REFERENCE TO RELATED APPLICATIONS

This application claims the benefit of U.S. Provisional Application No. 62/293,523 filed on Feb. 10, 2016, the contents of which are incorporated herein by reference in their entirety.

BACKGROUND

The field of the disclosure relates generally to turboprop, open rotor, and ducted propeller assemblies and, more particularly, to a shape of a wing leading edge, a pylon leading edge and/or other surface positioned downstream of a turboprop, open rotor, or ducted propeller assembly.

Most propellers of known open rotor, turboprop, ducted propeller, and propfan assemblies are positioned upstream of a wing or pylon to which the assembly is mounted or other surface, such as a duct wall. Unsteady aerodynamic interaction between the propeller and a downstream wing, pylon, or other surface on a typical wing-mounted or fuselage-mounted open rotor, turboprop, propfan, or ducted propeller assembly leads to additional sound generation. The sound generated by these unsteady aerodynamic interactions may dominate higher harmonics of the propeller blade passing frequency (BPF) tones. Furthermore, unsteady aerodynamic interactions between a propeller and downstream structures may lead to reductions in aerodynamic efficiency of the propeller.

BRIEF DESCRIPTION

In one aspect, an apparatus configured to reduce acoustic interactions between a propeller and a surface of a craft positioned downstream of the propeller is provided. The apparatus includes a surface modification element of the surface of the craft. The surface modification element defines a modified contour of the surface. The modified contour is configured to decorrelate a phase distribution of a plurality of sound sources within a source field positioned on at least a portion of the surface.

In another aspect, a propulsion assembly for a craft is provided. The propulsion assembly includes a propeller. The craft includes a surface positioned downstream of the propeller. The propulsion assembly also includes a surface modification element of the surface. The surface modification element defines a modified contour of the surface. The modified contour is configured to decorrelate a phase distribution of a plurality of sound sources within a source field positioned on at least a portion of the surface.

In another aspect, an aircraft is provided. The aircraft includes a fuselage, a plurality of wings coupled to the fuselage, at least one propulsion assembly that includes a propeller, and a surface modification element of a surface of the aircraft. The at least one propulsion assembly is coupled to at least one of at least one wing of the plurality of wings and the fuselage. The surface modification element defines a modified contour of the surface. The surface is positioned within a wake that includes a plurality of propeller wakes and a plurality of tip vortices produced by the propeller. The modified contour is configured to decorrelate a phase distribution of a plurality of sound sources within a source field positioned on at least a portion of the surface.

DRAWINGS

These and other features, aspects, and advantages of the present disclosure will become better understood when the following detailed description is read with reference to the accompanying drawings in which like characters represent like parts throughout the drawings, wherein.

Figure 7:
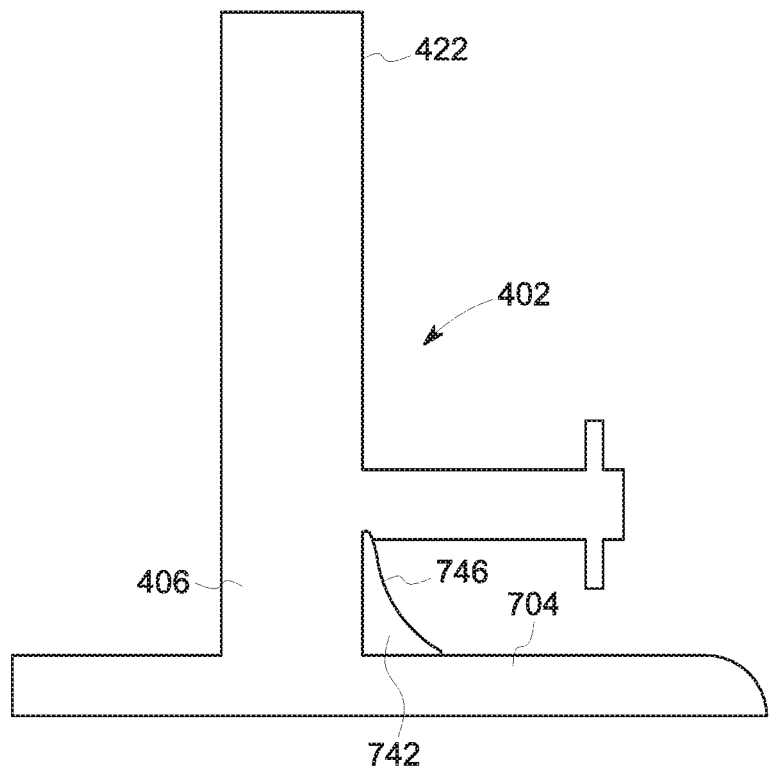
FIG. 7 is a top plan view of a fuselage portion and a wing portion with propulsion assembly from the aircraft shown in FIG. 1, showing another exemplary apparatus for reducing unsteady acoustic interactions that defines a curved leading edge sweep profile.
Figure 8:
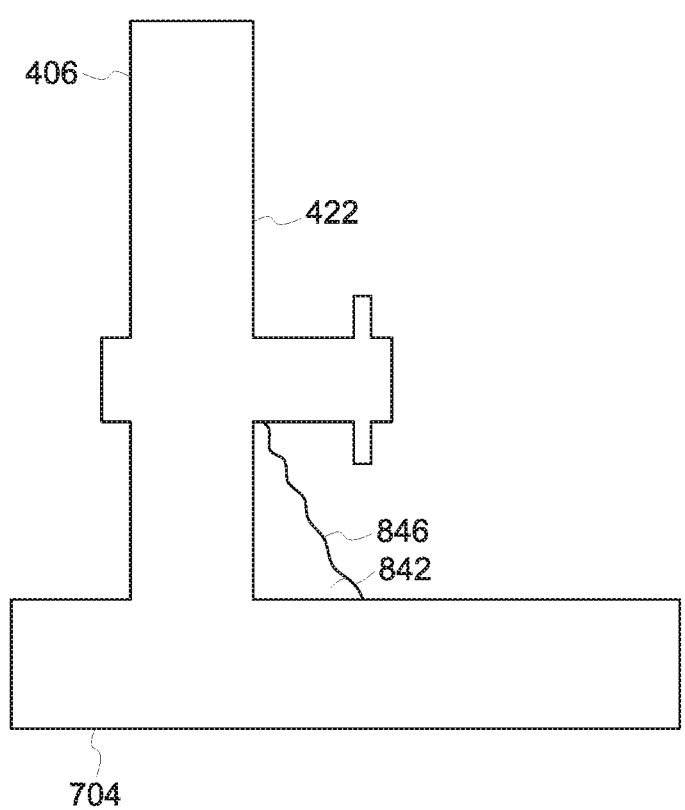
FIG. 8 is a top plan view of the fuselage portion and the wing portion with propulsion assembly shown in FIG. 7, showing another exemplary apparatus for reducing unsteady acoustic interactions that defines a wavy leading edge sweep profile.
Figure 9:
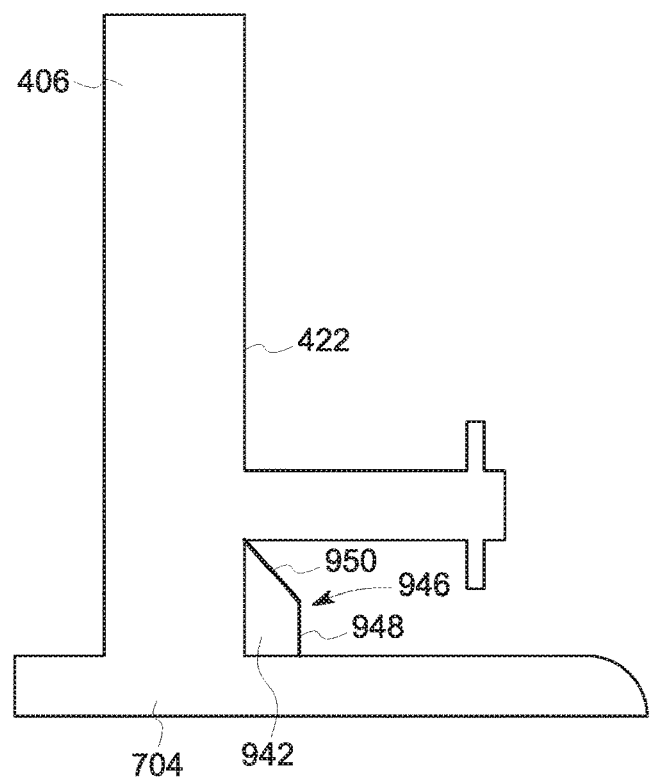
FIG. 9 is a top plan view of the fuselage portion and the wing portion with propulsion assembly shown in FIG. 7 and FIG. 8, showing another exemplary apparatus for reducing unsteady acoustic interactions that defines a segmented linear leading edge sweep profile.
Figure 14:
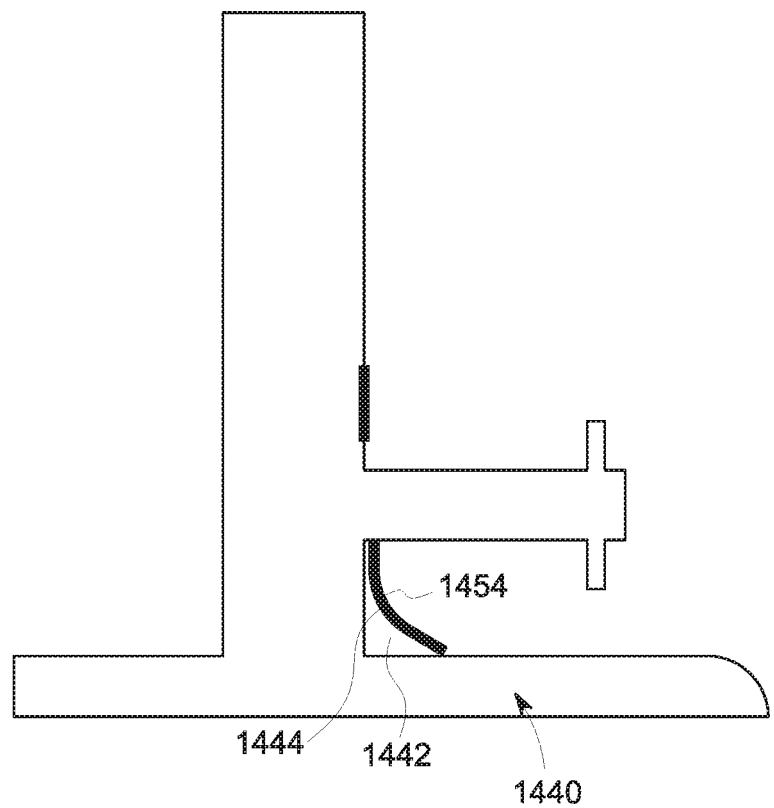
Figure 15:
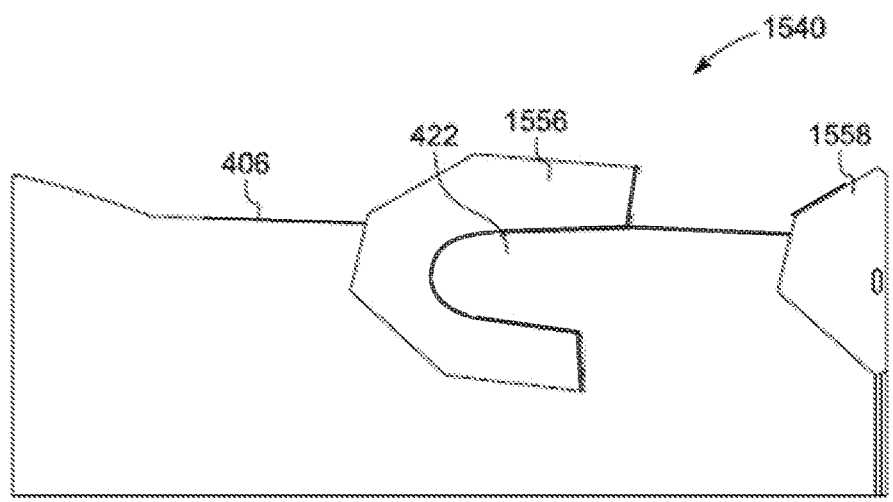

FIG. 14 is a top plan view of the fuselage portion and the wing portion with propulsion assembly shown in FIGS. 7, 8, and 9, showing an exemplary apparatus for reducing unsteady acoustic interactions that includes a liner; and FIG. 15 is a front perspective view of an exemplary aircraft wing showing an exemplary apparatus for reducing unsteady acoustic interactions that includes a leading edge fence.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Although generally described herein with respect to an aircraft, the apparatus, methods, and systems described are applicable to any craft that is powered by a propulsion assembly that includes a propeller, for example, without limitation, a water craft including a boat or a ship, an underwater craft including a submarine, and an aircraft.

The apparatus to reduce unsteady acoustic interactions between a propeller and a surface of an aircraft positioned downstream of the propeller as described herein overcomes a number of deficiencies associated with known aircraft propulsion assemblies. The apparatus is suitable for use with any known propulsion assembly that includes a propeller including, but not limited to, open rotor assemblies, turboprop assemblies, propfan assemblies, and ducted propeller assemblies. Specifically, the unsteady acoustic interactions between the propeller and one or more surfaces positioned downstream of the propeller leads to additional sound generation beyond the noise of the components of the aircraft propulsion assemblies (i.e. propeller noise) absent these unsteady acoustic interactions. The unsteady acoustic interactions may further induce undesired aeromechanical responses of the propeller and the surface. While the severity of the unsteady acoustic interactions could be reduced by redesigning elements of the propulsion assembly, such as the propeller airfoil section or the shape of the inlet, such approaches may be challenging to adjust for varying operational conditions, and unsteady aerodynamic interactions may still develop at selected flight conditions, such as takeoff and landing.

The surface modification element of the apparatus defines a modified contour of the surface downstream of the propeller that decorrelates the phases within a plurality of sound sources of a source field generated by the unsteady acoustic interactions. As a result, aerodynamically-generated sounds are reduced. In one aspect, the surface modification elements are coupled to exposed external surfaces of the aircraft including, but not limited to, the leading edges of aircraft wings and/or pylons. In this one aspect, each surface modification element may be repositioned, modified, and/or combined with one or more additional surface modification elements coupled to one or more additional surfaces to enhance the effect of the surface modification elements without substantial modification of the existing aircraft or associated systems.

Figure 1:
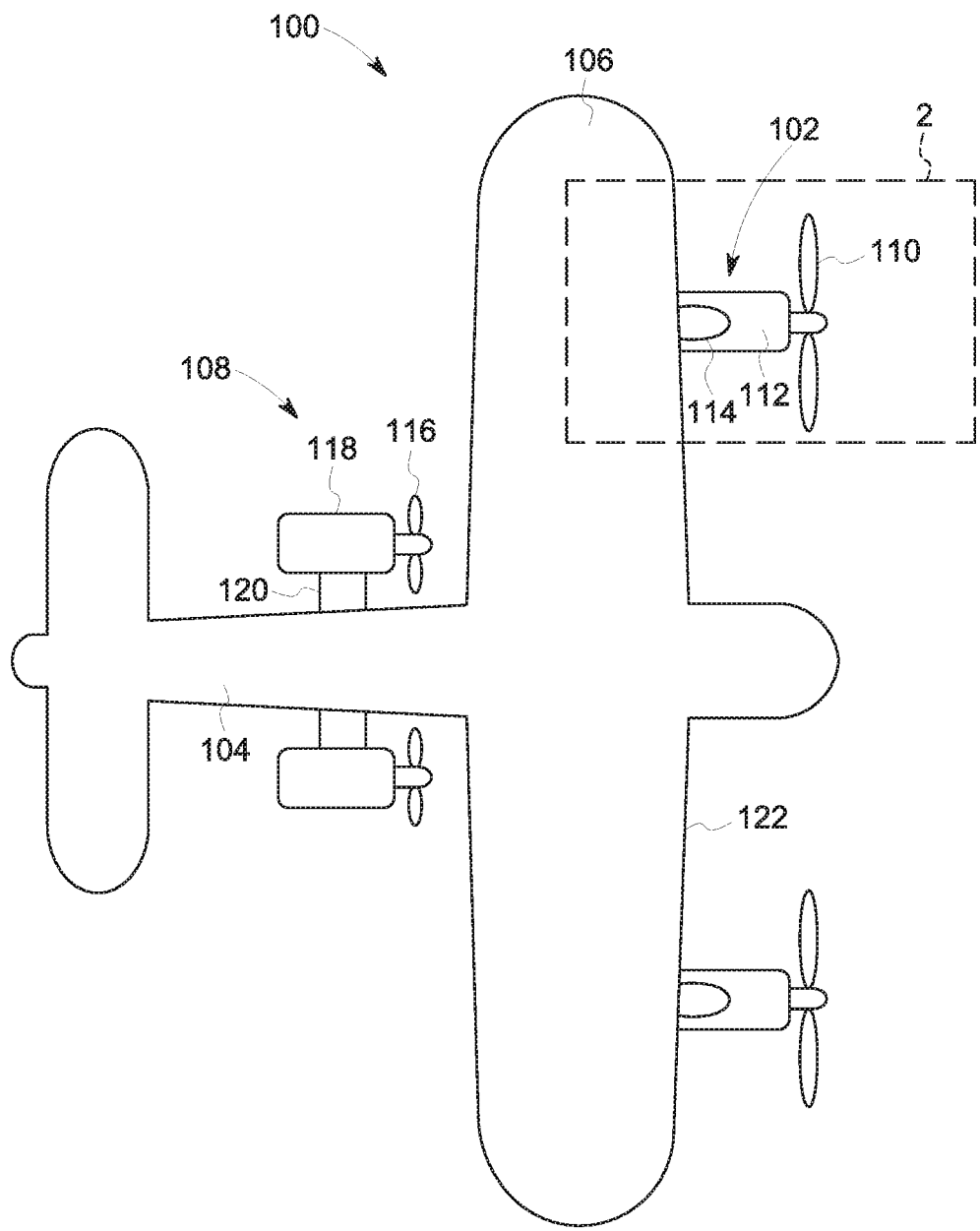
FIG. 1 is a top plan view of an exemplary aircraft showing an exemplary propulsion assembly.

FIG. 1 is a top plan view of an exemplary aircraft 100 showing an exemplary propulsion assembly 102 mounted on a wing 106. Aircraft 100 includes a fuselage 104, a plurality of wings 106 coupled to fuselage 104, and at least one propulsion assembly 102 coupled to wing 106. In other embodiments, at least one propulsion assembly 108 is coupled to fuselage 104 of aircraft 100, or coupled to any other part of aircraft 100 that enables aircraft 100 to operate as described herein.

Each wing-mounted propulsion assembly 102 includes a propeller 110, a housing 112, and a wing pylon 114 coupling housing 112 to wing 106. Each fuselage-mounted propulsion assembly 108 includes a propeller 116, a housing 118, and a fuselage pylon 120 coupling housing 118 to fuselage 104. In various embodiments, wing-mounted propulsion assembly 102 and fuselage-mounted propulsion assembly 108 are selected from any known propulsion assemblies that include a rotating propeller or fan. Non-limiting examples of aircraft propulsion assemblies with propellers or fan elements include open rotor assemblies, turboprop assemblies, propfan assemblies, ducted propeller assemblies, and any other known aircraft propulsion assemblies with propellers or fan elements.

Wings 106 of typical aircraft 100 have a constant sweep angle, defined herein as the angle between a perpendicular to the centerline of fuselage 104 and leading edge 122 of wing 106. As a result, leading edge 122 of wing 106 defines a straight line forming the sweep angle with centerline of fuselage 104. By way of non-limiting example, wing 106 as illustrated in FIG. 1 has leading edge 122 that is perpendicular to the centerline of fuselage 104, thus forming a sweep angle of zero degrees. Without being limited to any particular theory, the sweep angle incorporated into the design of aircraft 100 is influenced by one or more of at least several design factors including, but not limited to, the cruise flight speed.

In one aspect, typical aircraft 100 include one or more control surfaces 123 (not shown) including, but not limited to, ailerons, rudders, elevators, all-moveable horizontal tails, leading edge slats, leading edge flaps, moveable canards, flaperons, and any other suitable aircraft control surface 123.

Figure 2:
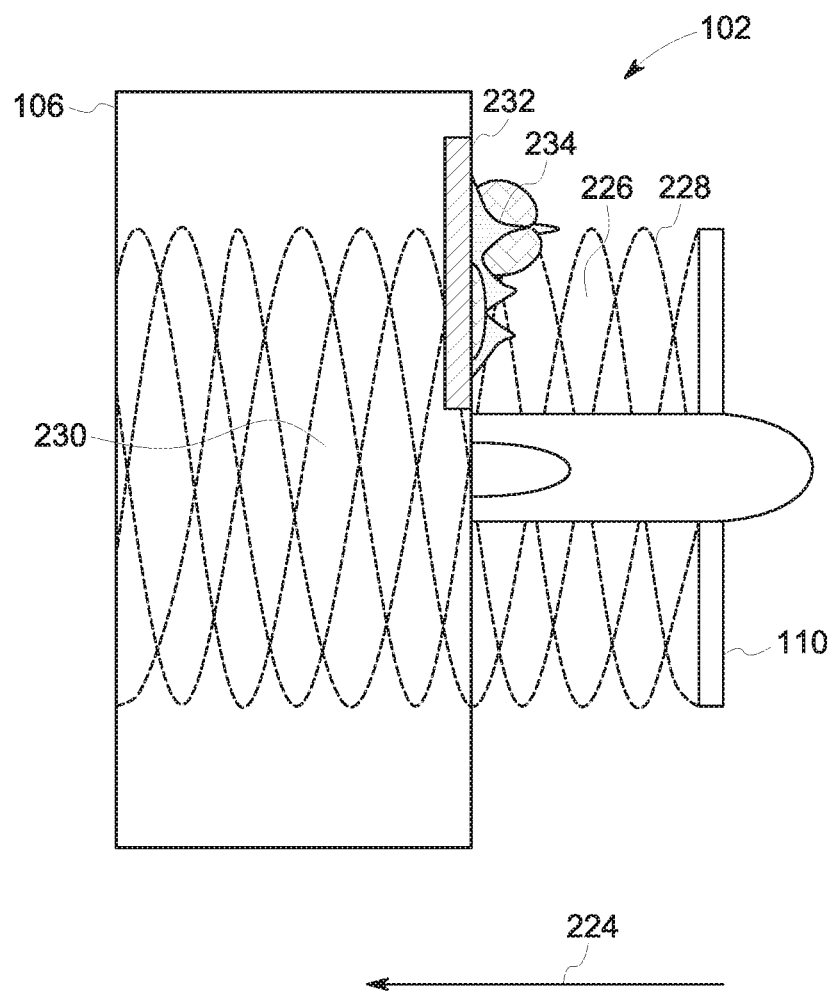
FIG. 2 is an enlarged top plan view of a wing section with a propulsion assembly from the aircraft shown in FIG. 1 taken along area 2 showing unsteady acoustic interactions.

FIG. 2 is a top plan view of wing 106 and propulsion assembly 102 with propeller 110 mounted on wing 106 taken along area 2 (shown in FIG. 1). In various embodiments, propeller 110 of propulsion assembly 102 introduces unsteady components to an airflow 224 passing through propeller 110. During operation of aircraft (not shown), propeller 110 rotates at a propeller blade passing frequency (BPF) to produce thrust. Without being limited to any particular theory, the aerodynamic interactions between rotating propeller 110 and passing airflow 224 introduce unsteady flow components including, but not limited to, a plurality of propeller wakes 226 and a plurality of tip vortices 228 that together form a wake 230. At least a portion of wake 230 induces pressure oscillations with acoustic frequencies corresponding to the blade passing frequency (BPF) and harmonics thereof that are generated as plurality of propeller wakes 226 and plurality of tip vortices 228 impinge on a surface 232 positioned downstream of propeller 110.

Without being limited to any particular theory, plurality of propeller wakes 226 and plurality of tip vortices 228 of wake 230 impinge on surface 232 to produce pressure oscillations (not shown) on surface 232. The pressure oscillations at surface 232 induce fluctuations in loading (not shown) across surface 232. This unsteady loading across surface 232 generates and radiates acoustic waves (not shown) from surface 232. Together, the distribution of acoustic waves resulting from the loading fluctuations across surface 232 define a source field 234 that includes the distribution of acoustic waves generated by a plurality of sound sources (not shown), in which each sound source corresponds to a portion of surface 232 subjected to unsteady loading as described above. As used herein, 'source field' refers to a spatial and temporal distribution of a plurality of sound sources along surface 232 that interact to generate noise. When the plurality of sound sources within source field 234 are relatively in phase, the resulting generated noise is louder than if the plurality of sound sources within source field 234 is distributed with significant phase cancelation or destructive interference.

Without being limited to any particular theory, the phase correlation of the plurality of sound sources within source field 234 with plurality of propeller wakes 226 and plurality of tip vortices 228 is influenced by any one or more of a plurality of factors including, but not limited to, the respective shapes or spatial distributions of the incoming plurality of propeller wakes 226 and plurality of tip vortices 228. The spatial distributions of the incoming plurality of propeller wakes 226 and plurality of tip vortices 228 are modified by modification of various characteristics of propeller 110 including, but not limited to, airfoil section shape, twist, camber, chord, taper, and any other relevant propeller characteristics. The spatial distributions of the plurality of sound sources within source field 234 are modified by modification of various characteristics of surface 232. Non-limiting examples of various characteristics of surface 232 suitable for modification include contour of surface 232, acoustic absorbance of materials forming surface 232, and any other relevant characteristics of surface 232.

In various embodiments, the spatial distribution of the plurality of sound sources within source field 234 is modified by local modification of the contour of surface 232. Without being limited to any particular theory, local modifications of the contour of surface 232 redirect, refocus, or modify the spatial distribution of the resulting plurality of sound sources within source field 234. With judicious local modification of the contour of surface 232, the spatial distribution of the plurality of sound sources within source field 234 is modified in such a manner as to decorrelate phase distribution within the source field 234, resulting in destructive interferences between sound sources within the source field 234 and an associated reduction in excess noise production by propeller 110 as described herein.

The excess noise resulting from correlated phase distribution within the source field 234 and associated positive interference between sound sources within the source field 234 may dominate higher harmonics of propeller blade passing frequency (BPF) tones, and potentially may contribute to increased fundamental BPF sound levels as well, adding to sound annoyance for both passengers and flight personnel in the aircraft cabin, as well as residents in the communities surrounding airports. Decorrelating the phase distribution within the source field not only reduces excess noise associated with constructive interference between sound sources within the source field, but also reduces the amplitude of loading fluctuations on surface 232 associated with plurality of propeller wakes 226 and plurality of tip vortices 228 impinging on surface 232. Further, a more efficient integration of aircraft 100 and propulsion assembly 102/108 may be attained by reduction of unsteady aerodynamic losses.

Figure 3:
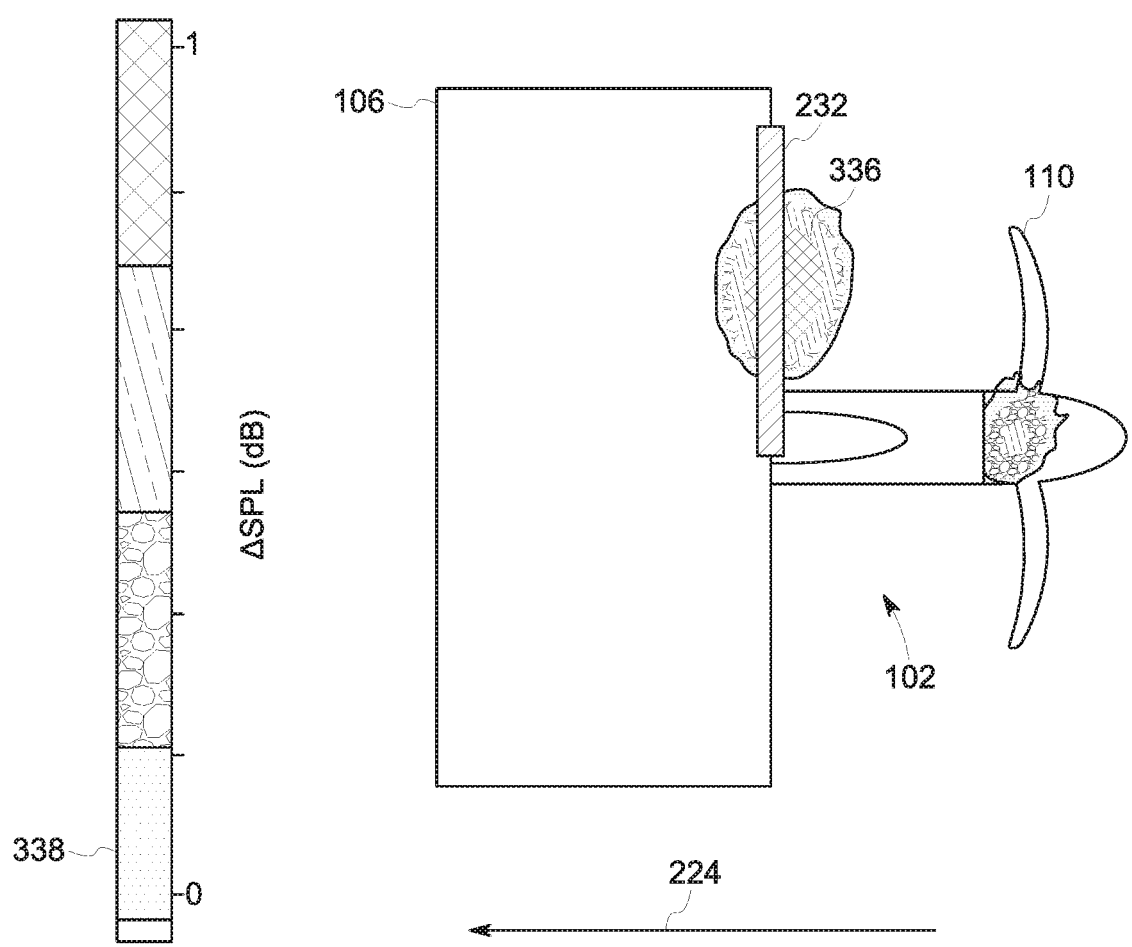
FIG. 3 is a top plan view of the wing section with the propulsion assembly shown in FIG. 2 showing a map of relative sound pressure level ($\Delta$SPL)

FIG. 3 is a top plan view of wing 106 and propulsion assembly 102 with propeller 110 mounted on wing 106 taken along area 2 (shown in FIG. 1). A hypothetical map 336 of an estimated relative amplitude of sound pressure level ($\Delta$SPL) is superimposed to demonstrate one manner of quantifying noise associated with interactions of the plurality of sound sources (not shown) within source field 234 (not shown). Additional noise associated with acoustic interactions within source field 234 is related to the spatial distribution and relative amplitude of sound pressure level ($\Delta$SPL), as summarized in map 336 with accompanying scale 338. Without being limited to any particular theory, the distribution and magnitude of $\Delta$SPL are related to the interaction of incoming plurality of propeller wakes 226 (not shown) and plurality of tip vortices 228 (not shown) from propeller 110 impinging on surface 232 to generate source field 234.

Figure 4:
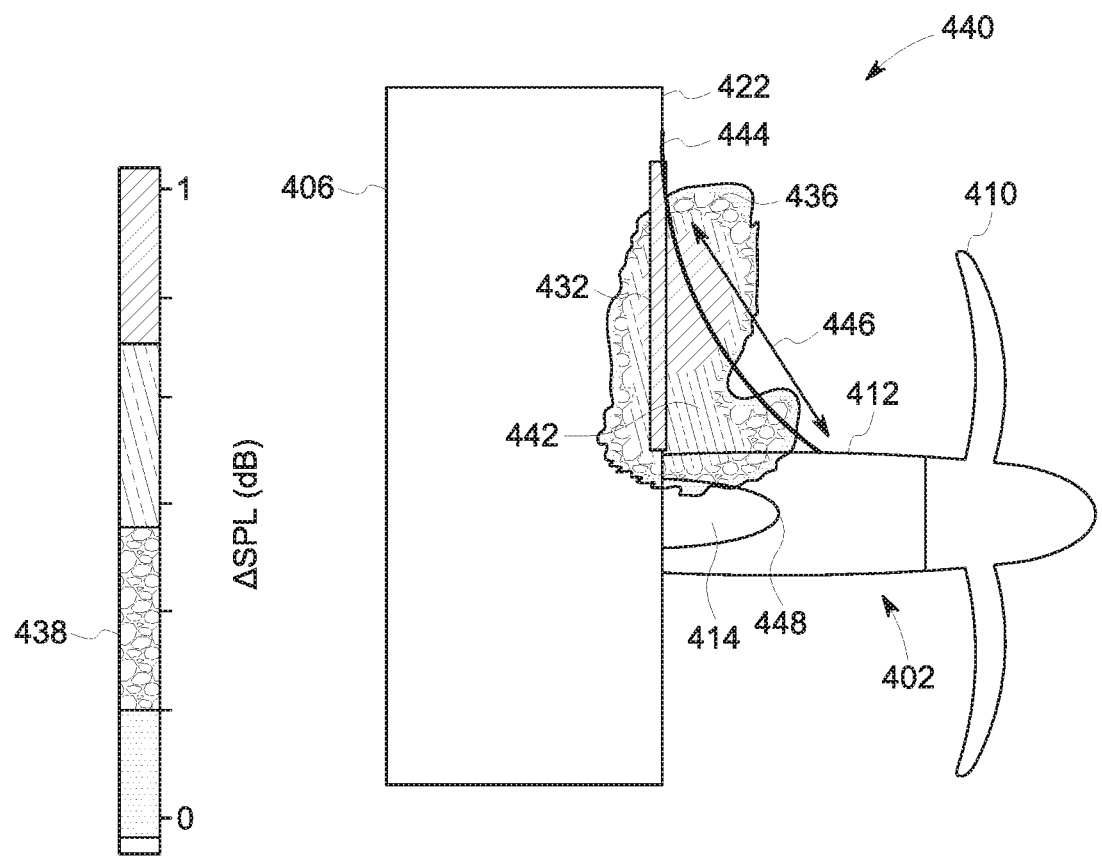
FIG. 4 is a top plan view of the wing section with the propulsion assembly shown in FIGS. 2 and 3, showing an exemplary apparatus for reducing unsteady acoustic interactions and a map of relative sound pressure level ($\Delta$SPL)

FIG. 4 is a top plan view of a section of a wing 406 and an apparatus 440 for reducing acoustic interactions between a propeller 410 and a surface 432 positioned downstream of propeller 410. Wing 406, propeller 410, and surface 432 are similar to wing 106, propeller 110, and surface 232, respectively (all shown in FIG. 3) except for apparatus 440 coupled to wing 406 to reduce the unsteady acoustic interactions. Apparatus 440 includes a surface modification element 442 of at least a portion of surface 432. Surface modification element 442 includes an outer skin 444 that defines a modified contour 446 of surface 432. As described above, modified contour 446 results in decorrelation of the plurality of sound sources (not shown) within source field 234 (not shown). The decorrelation of the plurality of sound sources results in the reduction of noise associated with unsteady acoustic interactions between propeller 410 and surface 432 as described above.

A hypothetical map 436 of the spatial distribution of relative sound pressure level ($\Delta$SPL) with scale 438 is superimposed to quantify noise associated with interactions of the plurality of sound sources (not shown) within source field 234 (not shown) as described above. Referring to FIG. 3 and FIG. 4, a comparison of the spatial distributions of map 336 and map 436 quantify the degree of modification of the distribution of $\Delta$SPL associated with the incorporation of surface modification element 442 into surface 432 of wing 406. Without being limited to any particular theory, the degree of modification of the spatial distribution of $\Delta$SPL quantifies the modification of noise produced by acoustic interactions between propeller 410 and surface 432.

In various embodiments, modified contour 446 defined by outer skin 444 of surface modification element 442 is shaped to produce a modified source field with enhanced decorrelation and associated destructive interference between sound sources with respect to an unmodified source field corresponding to an unmodified contour of surface 432. In one embodiment, modified contour 446 is determined empirically by comparing an acoustic map in the vicinity of surface 432 before and after incorporation of surface modification element 442. In this embodiment, modified contour 446 is iteratively designed by step-wise modification of candidate modified contours 446, evaluation of the resulting acoustic maps 436, and further modification based on this evaluation to produce a subsequent candidate modified contour 446.

Any known empirical or analytical method of evaluating unsteady acoustic interactions is used without limitation to shape outer skin 444 of surface modification element 442. Non-limiting examples of suitable known empirical methods include simulation using computational fluid dynamics and aeroacoustics methods, pressure and/or flow visualization measurements from wind tunnel models, measurements from full-scale flight test aircraft, and any other suitable known method of evaluating unsteady flow-induced interaction noise.

In various embodiments, surface modification element 442 of apparatus 440 is configured to define a modified contour 446 on any surface 432 of aircraft (not shown) positioned downstream of propeller 410 without limitation. Non-limiting examples of surfaces 432 suitable for modification using apparatus 440 include a pylon configured to mount a propulsion assembly 402 to wing 406 or fuselage (not shown) of an aircraft (not shown), such as a wing pylon 414 or a fuselage pylon (not shown); aerodynamic surfaces of an aircraft (not shown), such as wing 406, a horizontal tail (not shown), a vertical tail (not shown), and a canard (not shown); exposed surfaces of propulsion assembly 402 positioned downstream of propeller 410, such as a housing 412 and an inlet lip (not shown). In these various embodiments, surface 432 typically includes an upstream or leading edge region. Non-limiting examples of leading edges of aircraft components suitable for selection as a surface 432 in various embodiments include a pylon leading edge 448, a fuselage pylon leading edge (not shown), and a wing leading edge 422.

In some embodiments, surface modification element 442 is configured to couple to an exposed region of surface 432 without need for removal and/or significant modification of any of the structural elements defining surface 432 including, but not limited to, skin (not shown), stringers (not shown), spars (not shown), bulkheads (not shown), and other aircraft structural elements. In other embodiments, surface modification element 442 is configured to replace at least a portion of the structural elements defining surface 432 as described above. By way of non-limiting example, surface modification element 442 is provided as a skin panel (not shown) configured to replace an existing skin panel of wing 406 within at least a portion of surface 432. In other embodiments, surface modification element 442 is configured to couple to one or more modified aircraft structural elements as described above. By way of non-limiting example, surface modification element 442 is configured to couple to surface 432 that is modified by removing, reshaping, and/or otherwise modifying a skin panel (not shown) or an underlying structure. Non-limiting examples of underlying structures suitable for modification to modify surface 432 include spars (not shown), bulkheads (not shown), and stringers (not shown).

Modified contour 446 resulting from the incorporation of coupling surface modification element 442 into surface 432 takes on any shape without limitation in various embodiments. Non-limiting examples of shapes of modified contours 446, described in additional detail below, include a protrusion (not shown) relative to at least a portion of surface 432, a depression (not shown) relative to at least a portion of surface 432; and a wave (not shown) that includes at least one protrusion adjacent to at least one depression relative to at least a portion of surface 432. Modified contour 446 assumes any arbitrary symmetrical or non-symmetrical shape as needed to decorrelate the phase of acoustic sources distributed within the source field associated with the impingement of plurality of propeller wakes 226 and plurality of tip vortices 228 on surface 432. In various embodiments, two or more surface modification elements 442 are incorporated into the same surface 432. In various other embodiments, one or more surface modification elements 442 are incorporated into each of two or more surfaces 432.

Figure 5:
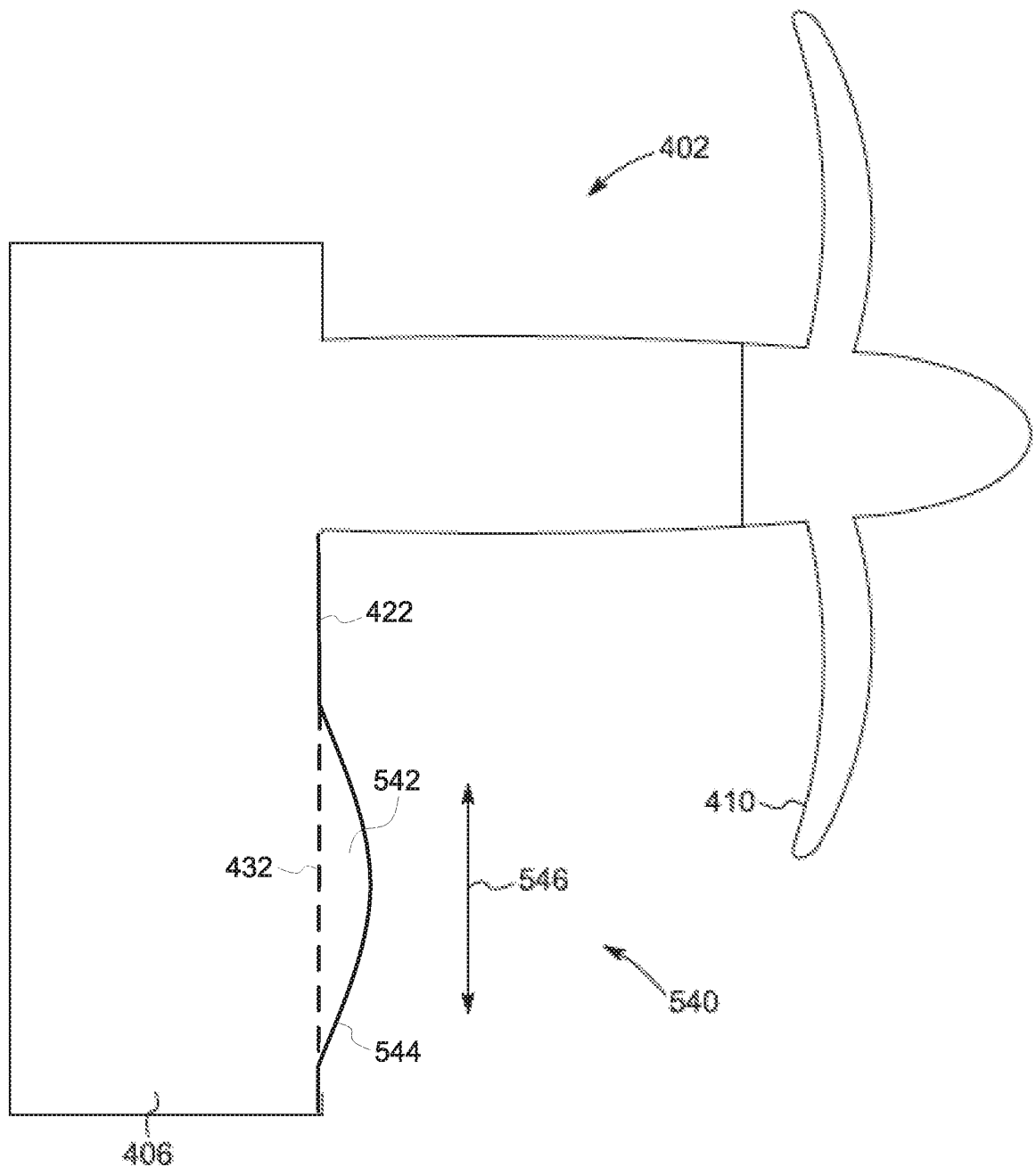
FIG. 5 is a top plan view of the aircraft section and propulsion assembly shown in FIGS. 2, 3, and 4, showing another exemplary apparatus for reducing unsteady acoustic interactions that defines a leading edge protrusion.

FIG. 5 is a top plan view of a section of wing 406 with another embodiment of an apparatus 540 for reducing unsteady acoustic interactions between propeller 410 and surface 432 positioned downstream of propeller 410. Apparatus 540 is similar to apparatus 440 (shown in FIG. 4), with the exception of shape, as described in additional detail below. Surface modification element 542 of apparatus 540 is incorporated into leading edge 422 of wing 406. Outer skin 544 of surface modification element 542 defines a protrusion contour 546. As used herein, the term "protrusion" refers to a portion of surface 432, such as leading edge 422, that is positioned above (or exterior to) the original surface 432.

Figure 6:
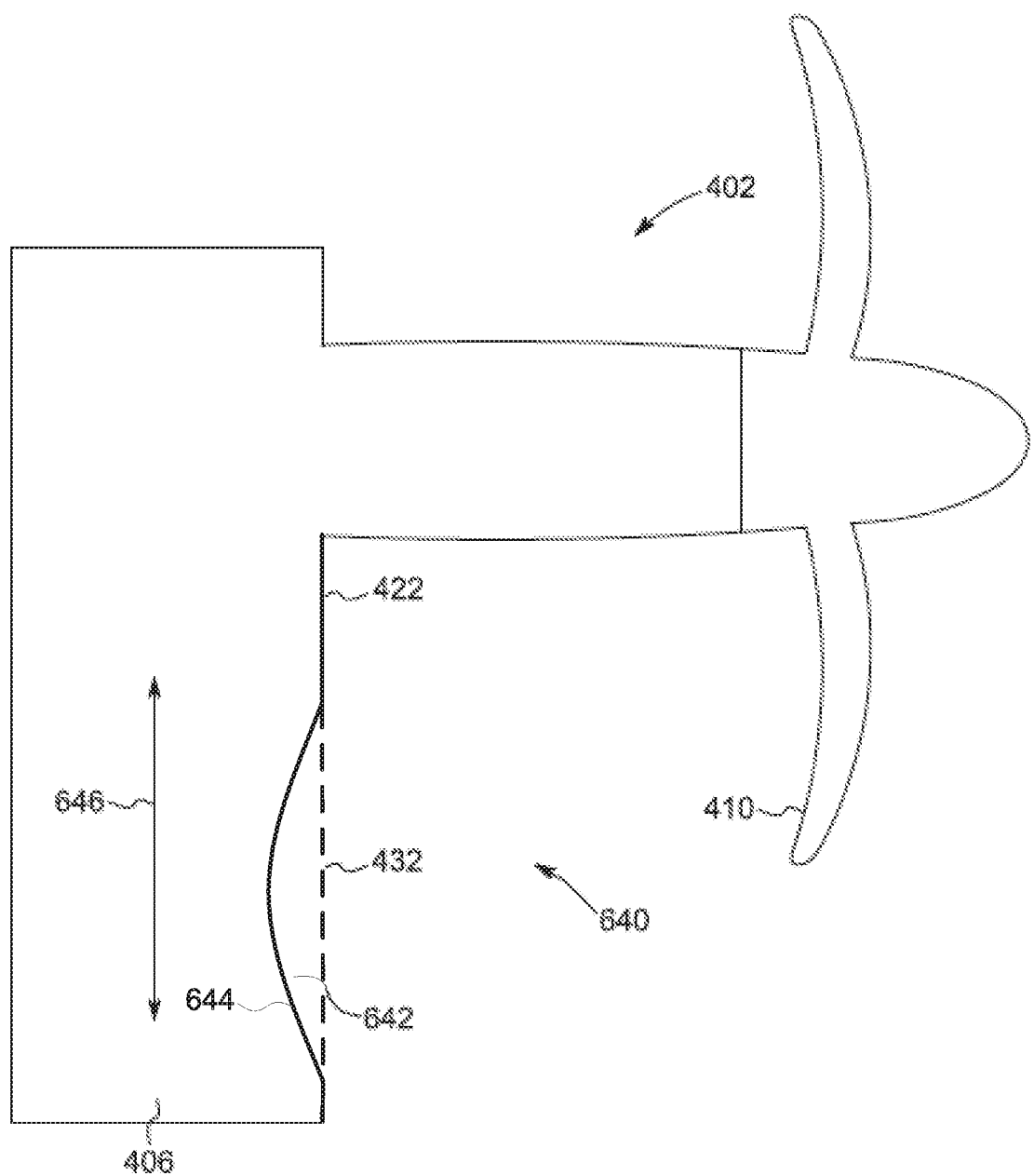
FIG. 6 is a top plan view of the aircraft section and propulsion assembly shown in FIGS. 2, 3, 4, and 5, showing another exemplary apparatus for reducing unsteady acoustic interactions that defines a leading edge depression.

FIG. 6 is a top plan view of a section of wing 406 with another embodiment of an apparatus 640 for reducing unsteady acoustic interactions between propeller 410 and surface 432 positioned downstream of propeller 410. Surface modification element 642 of apparatus 640 is incorporated into leading edge 422 of wing 406. Outer skin 644 of surface modification element 642 defines a depression contour 646. As used herein, the term "depression" refers to a portion of surface 432, such as leading edge 422, that is positioned below (or interior to) the original surface 432.

Referring to FIGS. 4, 5, and 6, any of modified surface contours 446, 546, 646 described above are strategically located along surface 432 including, but not limited to, leading edge 422 of wing 406 (e.g., at surface 432) to reduce the unsteady pressure response of wing 406 in various embodiments. In one embodiment, one of at least one protrusion contour 546 and at least one depression contour 646 positioned adjacent to one of at least one protrusion contour 546 and at least one depression contour 646 combine to form a wave contour (described below) along surface 432 including, but not limited to, leading edge 422 in the plane of wing 406 that favorably reduces unsteady acoustic interactions (not shown) at surface 432 by de-correlating the phase distribution of the wakes/vorticity interacting along surface 432, resulting in a quieter overall response.

At certain operating conditions of interest, the chord variations introduced by the wave modified contour of leading edge 422 described above may cause high flow acceleration (referred to herein as a leading edge suction peak) at modified leading edge 422 in the vicinity of a depression contour 646 due to the aerodynamic influence of one or more adjacent protrusion contours 546. This flow acceleration may limit the effectiveness of the wave modified contour and may possibly induce a detrimental effect on propeller noise. In one embodiment, the wave modified contour is oriented downward with respect to unmodified leading edge 422 to reduce local angle of attack or incidence to reduce the leading edge suction peak. In another embodiment, the wave modified contour also includes a modified curvature near the wave modified contour that is greater than a corresponding curvature of unmodified wing 406 to reduce the leading edge suction peak.

In various embodiments, the different positions, shapes, and orientations of one or more surface modification elements 442,542,642 of leading edge 422 of wing 406 modify one or more characteristics of wing 406 associated with aerodynamic performance in addition to de-correlating the phase distribution of the wakes/vorticity (not shown) interacting along leading edge 422 as described above. Non-limiting examples of one or more characteristics of wing 406 associated with aerodynamic performance that are modified by one or more surface modification elements 442,542,642 of leading edge 422 of wing 406 include wing sweep (not shown), wing camber (not shown), wing chord (not shown), wing thickness (not shown), and wing dihedral (not shown).

FIG. 7 is a top plan view of another embodiment of another embodiment of a surface modification element 742 that modifies the sweep angle of wing 406. Surface modification element 742 is incorporated into leading edge 422 of wing 406 as well as to a portion of fuselage 704. Surface modification element 742 includes a curved sweep contour 746 that defines a modified sweep angle that gradually transitions outboard to the nominal or baseline sweep angle of leading edge 422 of wing 406 outboard of surface modification element 742.

FIG. 8 is a top plan view of surface modification element 842 that modifies the sweep angle of wing 406 in an embodiment. Surface modification element 842 is incorporated into leading edge 422 of wing 406 as well as a portion of fuselage 704. Surface modification element 842 includes a wavy modified contour 846 that defines a local sweep angle that fluctuates to lower and higher sweep angles outboard of fuselage 704 and transitions to the nominal or baseline sweep angle of leading edge 422 of wing 406 outboard of surface modification element 842.

FIG. 9 is a top plan view of surface modification element 942 that modifies the sweep angle of wing 406 in another embodiment. Surface modification element 842 is incorporated into leading edge 422 of wing 406 as well as a portion of fuselage 704. Surface modification element 942 includes a faceted modified contour 946 that includes a first linear segment 948 with a first modified sweep angle positioned adjacent to fuselage 704 and a second linear segment 950 with a second modified sweep angle positioned outboard of first linear segment 948.

Figure 10:
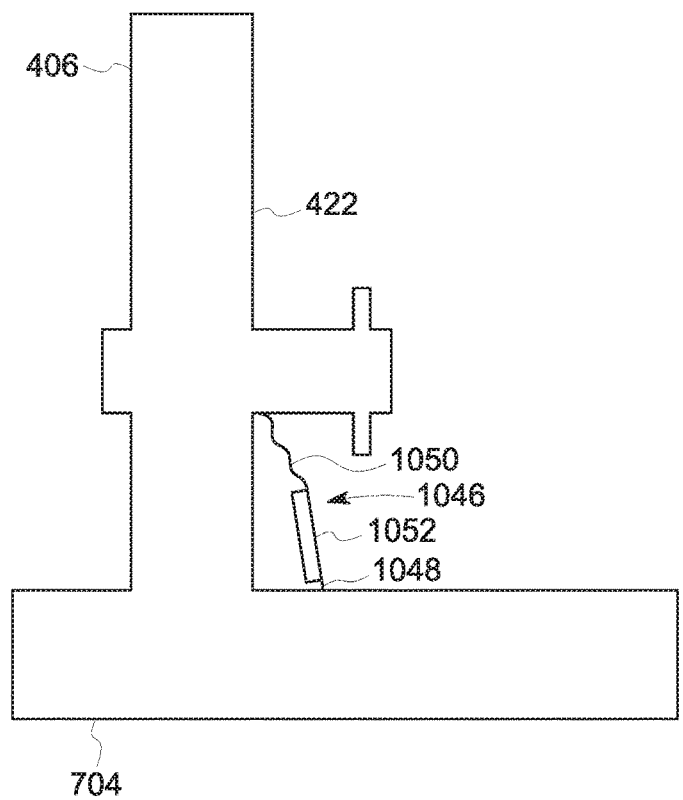
FIG. 10 is a top plan view of the fuselage portion and the wing portion with propulsion assembly shown in FIG. 7, FIG. 8, and FIG. 9 showing another exemplary apparatus for reducing unsteady acoustic interactions that defines a composite leading edge sweep profile.

FIG. 10 is a top plan view of surface modification element 1042 that modifies the sweep angle of wing 406 in another embodiment. Surface modification element 1042 is incorporated into leading edge 422 of wing 406 as well as a portion of fuselage 704. Surface modification element 1042 includes a composite modified contour 1046 that includes a first linear segment 1048 with a first modified sweep angle positioned adjacent to fuselage 704 and a second wavy segment 1050 positioned outboard of first linear segment 1048. First linear segment 1048 is configured to accommodate a leading edge slat 1052.

Figure 11:
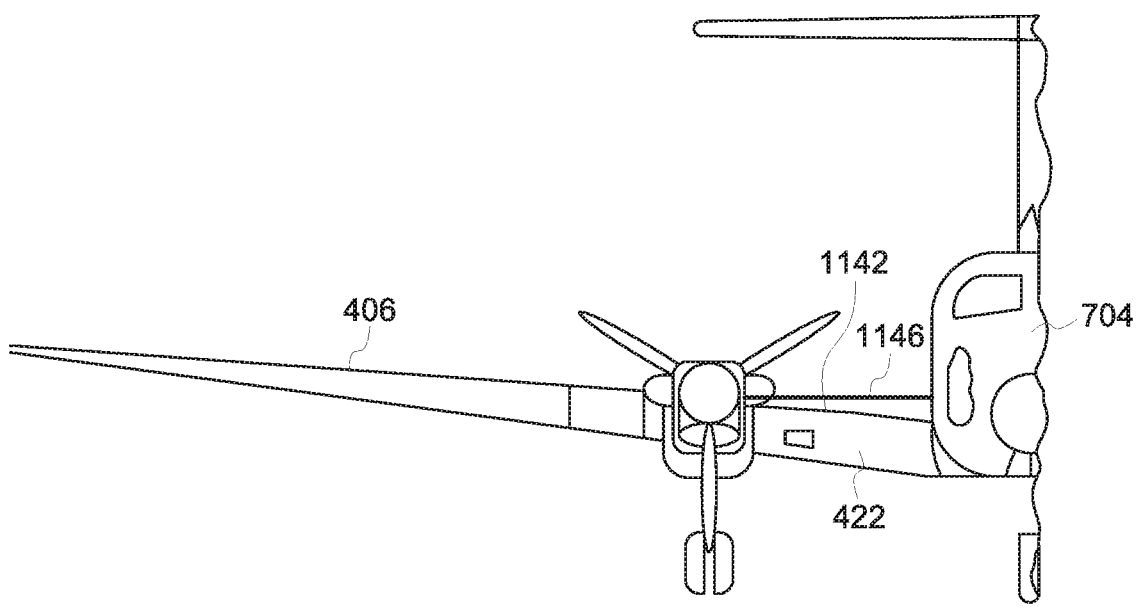
FIG. 11 is a front view of an exemplary aircraft wing showing an exemplary propulsion assembly and an exemplary apparatus for reducing unsteady acoustic interactions that defines a linear dihedral angle modification.

FIG. 11 is a front view of a surface modification element 1142 with a linear modified contour 1146 that is incorporated into leading edge 422 of wing 406 as well as a portion of fuselage 704. Surface modification element 1142 defines a modified dihedral angle in another embodiment. Dihedral angle, as used herein, refers to an angle formed between a centerline (not shown) of wing 406 with respect to a horizontal reference direction (not shown). Surface modification element 1142 includes a linear modified contour 1146 that defines a linear modification of dihedral angle. The linear modification of dihedral angle alters the dihedral angle of the wing to a constant angle that is different than the dihedral angle of leading edge 422 of wing 406 outboard of surface modification element 1142. In one embodiment, surface modification element 1142 is incorporated into leading edge 422 of wing 406 or other wing surface at any location where the interaction noise sources are loudest, and need not be incorporated in a location that modifies the dihedral angle associated with the principal structural features of the wing 406.

Figure 12:
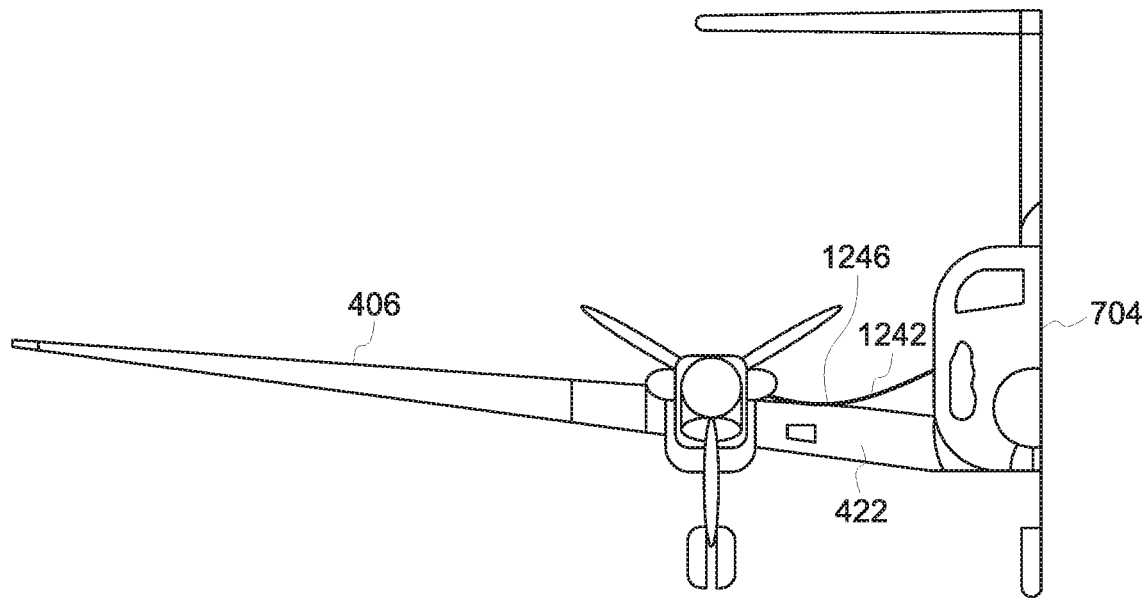
FIG. 12 is a front view of the aircraft wing and the propulsion assembly shown in FIG. 11 showing another exemplary apparatus for reducing unsteady acoustic interactions that defines a curved dihedral angle modification.

FIG. 12 is a front view of surface modification element 1242 with a curved modified contour 1246 that is incorporated into leading edge 422 of wing 406 as well as a portion of fuselage 704 in another embodiment. Curved modified contour 1246 defines a modified dihedral angle that gradually transitions outboard to the dihedral angle of leading edge 422 of wing 406 outboard of surface modification element 1242.

Figure 13:
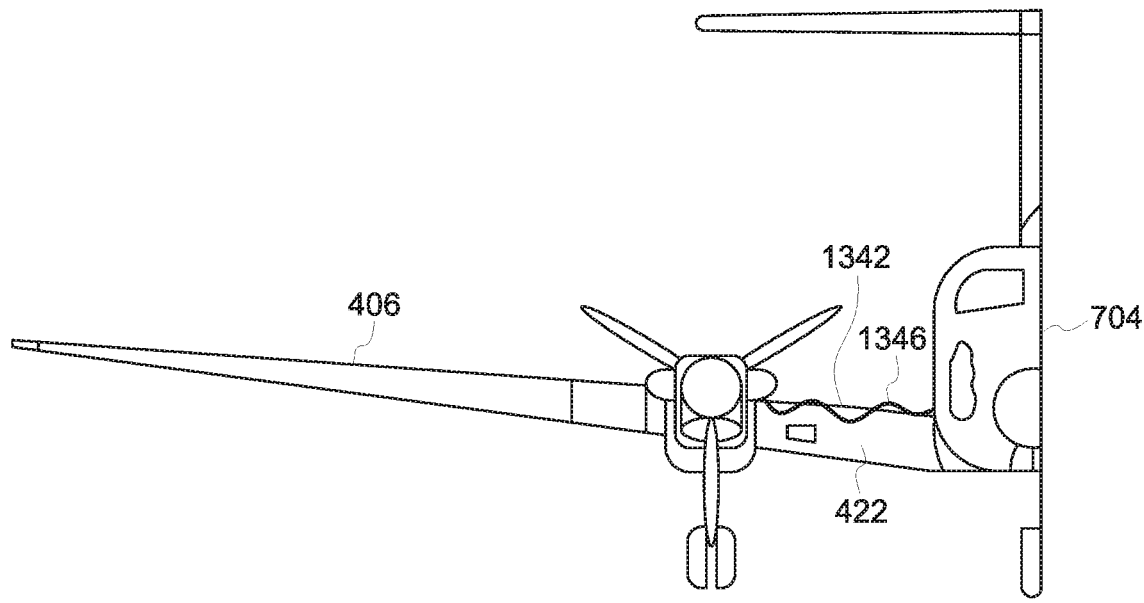
FIG. 13 is a front view of the aircraft wing and the propulsion assembly shown in FIGS. 11 and 11 showing another exemplary apparatus for reducing unsteady acoustic interactions that defines a wavy dihedral angle modification.

FIG. 13 is a front view of surface modification element 1342 with a wavy modified contour 1346 that is incorporated into leading edge 422 of wing 406 as well as a portion of fuselage 704 in another embodiment. Modified contour 1346 of surface modification element 1342 defines a wavy modified dihedral angle. The wavy modified dihedral angle fluctuates in the outboard direction and transitions to the dihedral angle of leading edge 422 of wing 406 outboard of surface modification element 1342.

FIG. 14 is a top plan view of an apparatus 1440 that further includes an acoustic suppression liner 1454 configured to enhance the noise reduction of surface modification element 1442 in another embodiment. Liner 1454 is coupled to at least a portion of outer skin 1444 of surface modification element 1442. In various embodiments, liner 1454 extends over at least a portion of surface modification element 1442. Liner 1454 is constructed of an acoustically absorbent material including, but not limited to, a perforation sheet over acoustic resonator cavities or sound absorbing material. Without being limited to any particular theory, the acoustically absorbent material of liner 1454 is selected to reduce the intensity of the unsteady acoustic interactions generated by the action of plurality of propeller wakes 226 and plurality of tip vortices 228 impinging on outer skin 1444.

FIG. 15 is a front perspective view of an apparatus 1540 which further includes a leading edge fence 1556 in another embodiment. Leading edge fence 1556 is one type of flow control device configured to isolate acoustic interactions occurring proximate to leading edge fence 1556. Leading edge fence 1556 is attached to leading edge 422 of wing 406. In various embodiments, apparatus 1540 may further include one or more additional leading edge fences 1558 attached to leading edge 422 of wing 406 to further isolate acoustic interactions (not shown). Without being limited to any particular theory, leading edge fence 1556 and optionally one or more additional leading edge fences 1558 reduce the noise perceived by aircraft passengers by enhancing shielding and scattering of unsteady acoustic interactions (not shown).

The above-described apparatuses include modifications to reduce aeroacoustic interactions between propellers and surfaces of aircraft positioned downstream of the propellers associated with the operation of propulsion assemblies that include propellers or fans. Non-limiting examples of propulsion assemblies in which such aeroacoustic interactions are relevant include rotor assemblies, turboprop assemblies, propfan assemblies, and ducted propeller assemblies. Specifically, the apparatuses described herein modify the surface contour of one or more surfaces positioned downstream of one or more propellers or fans. This modified surface contour decorrelates the phases of acoustic sources within the source field wave fronts produced by impact of a plurality of propeller wakes and/or a plurality of propeller tip vortices on the one or more modified surfaces relative to the phases of the unmodified source field associated with the unmodified surface. The phase decorrelation of the acoustic sources within the modified source field results in a reduction in noise produced during operation of the propulsion system. As such, the apparatus includes a surface modification element of the surface of the aircraft that includes an outer skin that defines a modified contour of the surface configured to decouple the acoustic sources within the modified source field relative to the unmodified source field of the unmodified surface of the aircraft. Surfaces suitable for modification using the apparatus include wing leading edges and leading edges of pylons, such as wing pylons and fuselage pylons, which are used to couple the propulsion assemblies to the wing or fuselage of the aircraft, respectively. A variety of surface contour modifications of the surfaces are enabled by the apparatus including, but not limited to, protrusions, depressions, and combinations of protrusions and depressions, such as wavy modified surface profiles.

Exemplary technical effect of the methods, systems, and apparatus described herein includes reducing the propeller/propfan/open rotor wake-wing interaction noise.

Exemplary embodiments of the surface modification elements and associated systems, devices, and methods of operating such systems and devices are not limited to the specific embodiments described herein, but rather, components of systems and/or steps of the methods may be utilized independently and separately from other components and/or steps described herein. For example, the methods may also be used in combination with other systems requiring decorrelation of incoming and reflected acoustic wave forms, and are not limited to practice with only the operation of aircraft, aircraft wings/pylons, and/or aircraft propulsion assemblies as described herein. Rather, the exemplary embodiment can be implemented and utilized in connection with many other applications related to modulation of acoustic interactions.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system configured to reduce acoustic interactions between a propeller and a surface of a craft, said system comprising:
    the surface of the craft configured to be positioned downstream of the propeller of the craft; and
    a surface modification element of the surface of the craft, said surface modification element defining a modified contour of the surface, wherein said modified contour is configured to decorrelate a phase distribution of a plurality of sound sources within a source field positioned on at least a portion of the surface.

2. The system in accordance with claim 1, wherein said surface modification element is configured to be positioned within a wake comprising a plurality of propeller wakes and a plurality of tip vortices produced by the propeller.

3. The system in accordance with claim 1, wherein the craft includes at least one of at least one wing and at least one pylon, and wherein the surface includes at least one of a wing leading edge and a pylon leading edge.

4. The system in accordance with claim 1, wherein said modified contour defined by said surface modification element comprises at least one of:
    at least one protrusion relative to at least one portion of the surface
    at least one depression relative to said at least one portion of the surface; and
    a wave comprising any one of said at least one protrusion and said at least one depression adjacent to any one of said at least one protrusion and said at least one depression relative to the at least one portion of the surface.

5. The system in accordance with claim 1, wherein the craft includes at least one of a wing and a control surface, and wherein said modified contour defined by said surface modification element locally modifies at least one wing characteristic including one or more of a wing sweep, a wing camber, a wing chord, a wing thickness, and a wing dihedral.

6. The system in accordance with claim 1, further comprising a liner, said liner comprising an acoustically absorbent material extending over at least a portion of said surface modification element.

7. The system in accordance with claim 1, wherein the acoustic interactions include at least one of a propeller noise and an aeromechanical response of the surface.

8. The system in accordance with claim 1, further comprising at least one additional surface modification element of at least one additional surface of the craft.

9. The system in accordance with claim 1, wherein the surface modification element is coupled to the surface of the craft.

10. A propulsion assembly for a craft comprising:
    a propeller, wherein the craft includes a surface of the craft positioned downstream of said propeller; and
    a surface modification element of the surface, said surface modification element defining a modified contour of the surface, wherein said modified contour is configured to decorrelate a phase distribution of a plurality of sound sources within a source field on at least a portion of the surface.

11. The propulsion assembly in accordance with claim 10, wherein said surface modification element is positioned within a wake comprising a plurality of propeller wakes and a plurality of tip vortices produced by said propeller.

12. The propulsion assembly in accordance with claim 10, wherein the craft includes at least one of at least one wing and at least one pylon, and wherein the surface includes at least one of a wing leading edge and a pylon leading edge.

13. The propulsion assembly in accordance with claim 10, wherein said modified contour defined by said surface modification element comprises at least one of:
    at least one protrusion relative to at least one portion of the surface;
    at least one depression relative to the at least one portion of the surface; and
    a wave comprising any one of said at least one protrusion and said at least one depression adjacent to any one of said at least one protrusion and said at least one depression relative to the at least one portion of the surface.

14. The propulsion assembly in accordance with claim 10, wherein the craft includes at least one of a wing and a control surface, and wherein said modified contour defined by said surface modification element locally modifies at least one wing characteristic including one or more of a wing sweep, a wing camber, a wing chord, a wing thickness, and a wing dihedral.

15. The propulsion assembly in accordance with claim 10 further comprising a liner, said liner comprising an acoustically absorbent material extending over at least a portion of said surface modification element.

16. The propulsion assembly in accordance with claim 10, wherein said surface modification element is configured to reduce at least one of a propeller noise and an aeromechanical response of the surface.

17. The propulsion assembly in accordance with claim 10 further comprising at least one additional surface modification element of at least one additional surface of the craft.

18. The propulsion assembly in accordance with claim 10, wherein said propulsion assembly includes one of an open rotor assembly, a turboprop assembly, a propfan assembly, and a ducted propeller assembly.

19. An aircraft comprising:
a fuselage;
a plurality of wings coupled to said fuselage;
at least one propulsion assembly coupled to at least one of at least one wing of said plurality of wings and said fuselage, wherein said at least one propulsion assembly comprises a propeller; and
a surface modification element of a surface of said aircraft, said surface modification element defining a modified contour of said surface, wherein said surface is positioned within a wake comprising a plurality of propeller wakes and a plurality of tip vortices produced by said propeller and wherein said modified contour is configured to decorrelate a phase distribution of a plurality of sound sources within a source field positioned on at least a portion of said surface.

20. The aircraft in accordance with claim 19, wherein said modified contour defined by said outer skin comprises at least one of:
at least one protrusion relative to at least one portion of said surface;
at least one depression relative to said at least one portion of said surface; and
a wave comprising any one of said at least one protrusion and said at least one depression adjacent to any one of said at least one protrusion and said at least one depression relative to the at least one portion of the surface.

21. The aircraft in accordance with claim 19 further comprising at least one pylon, wherein each wing of said plurality of wings comprises a wing leading edge and said at least one pylon comprises a pylon leading edge, and wherein said surface comprises at least one of said wing leading edge and said pylon leading edge.

22. The aircraft in accordance with claim 19, wherein said at least one propulsion assembly comprises one of an open rotor assembly, a turboprop assembly, a propfan assembly, and a ducted propeller assembly.

23. The aircraft in accordance with claim 19, wherein said surface modification element is configured to reduce at least one of a propeller noise and an aeromechanical response of said surface.

24. The aircraft in accordance with claim 19, wherein said modified contour defined by said surface modification element locally modifies at least one characteristic of said plurality of wings, the at least one characteristic including one or more of a wing sweep, a wing camber, a wing chord, a wing thickness, and a wing dihedral.

* * * * *